F. MITCHELL.
CONVERTIBLE AUTOMOBILE BODY.
APPLICATION FILED FEB. 28, 1921.

1,401,177.

Patented Dec. 27, 1921.
2 SHEETS—SHEET 1.

Witness
H. Woodard

Inventor
FRANK MITCHELL
By H. B. Wilson & Co.
Attorneys

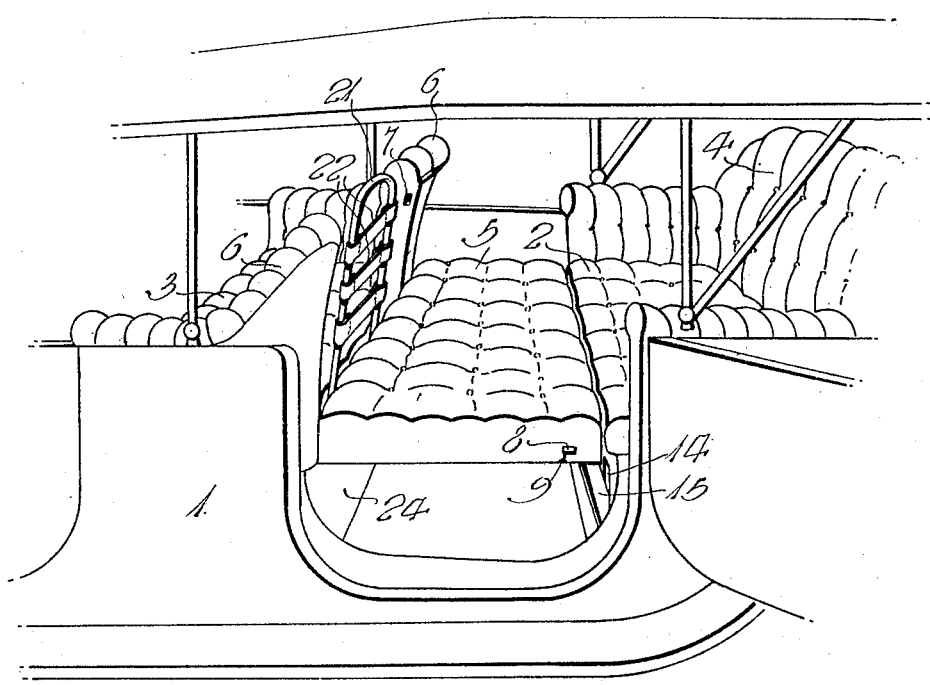

UNITED STATES PATENT OFFICE.

FRANK MITCHELL, OF HOUSTON, TEXAS.

CONVERTIBLE AUTOMOBILE-BODY.

1,401,177. Specification of Letters Patent. Patented Dec. 27, 1921.

Application filed February 23, 1921. Serial No. 448,573.

*To all whom it may concern:*

Be it known that I, FRANK MITCHELL, a citizen of the United States, residing at Houston, in the county of Harris and State of Texas, have invented certain new and useful Improvements in Convertible Automobile-Bodies; and I do declare the following to be a full, clear, and exact description of the invention, such as will enable others skilled in the art to which it appertains to make and use the same.

This invention relates to an improved automobile body and one object of the invention is to provide a body in which the back of the front seat may be swung down to extend between the front and rear seats and together with the front and rear seats when lowered provide a bed construction.

Another object of the invention is to provide means for supporting the back of the forward seat when swung down to the lowered position and further so construct and mount the supporting means for the lowered back that the supporting means may be swung under the rear seat and out of the way when not in use.

Another object of the invention is to provide improved means for securing the back in a raised position and for securing the back in a lowered position.

Another object of the invention is to provide an improved auxiliary back support which may be put in place when the back is lowered.

Another object of the invention is to so construct this body that the car will be conventional in its appearance when the back is in a raised position.

This invention is illustrated in the accompanying drawings, wherein:

Fig. 4 is a fragmentary sectional view through the lowered back and rear seat.

Fig. 5 is a fragmentary sectional view taken along the line 5—5 of Fig. 1.

Figure 1:
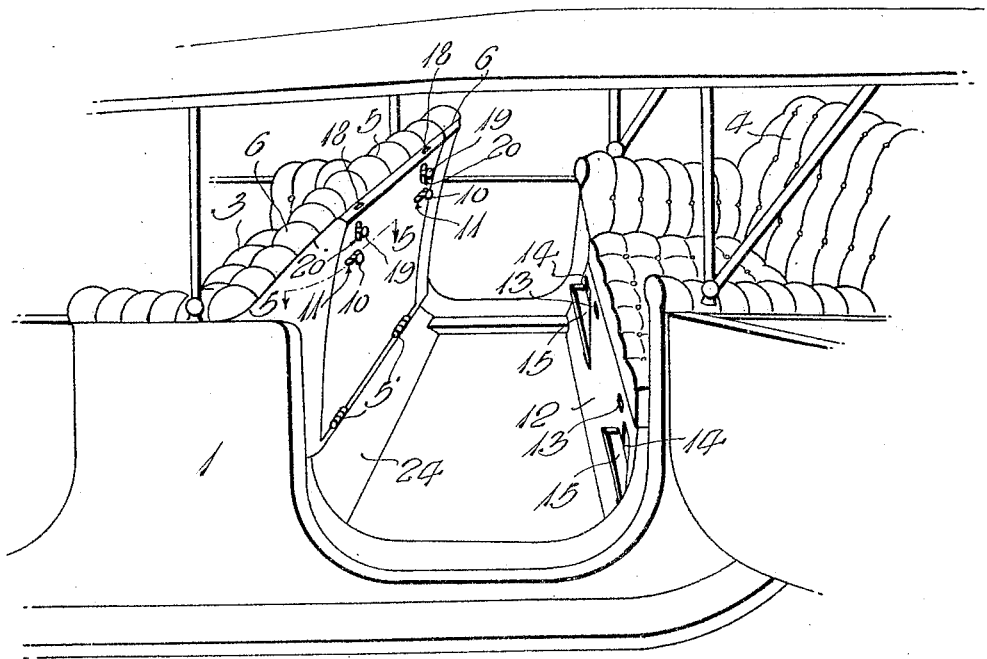
Figure 1 is a perspective view showing the back in a raised position and the support for the back when lowered swung out to an operative position.
Figure 3:
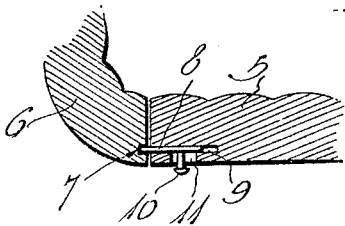
Fig. 3 is a longitudinal sectional view through the structure of Fig. 2.

This improved construction has been illustrated in connection with an automobile of the touring car type provided with a body 1 having a rear seat 2 and a forward seat 3, the rear seat having the usual back construction 4 and the front seat having its back provided with a section 5 which is separate from the side portions 6 and hingedly mounted as shown at 7 so that this back section 5 of the forward seat may be swung down from the position shown in Fig. 1 to that shown in Fig. 2. In order to retain the back section 5 in the raised position, the side portions 6 are each provided with a socket 7 and the back section is provided with sliding bolts 8 mounted in pockets 9 as shown in Fig. 5 and provided with actuating stems 10 which extend through slots 11 so that the bolts may be readily moved to an operative or inoperative position. The wall 12 of the rear seat 2 is provided with sockets 13 and with sockets 14, the slots being provided so that supporting arms 15 may be hingedly connected with the inner face of this wall as shown at 16 and extend through the slots to the operative position where they will be retained in the angular position shown in Fig. 4 and prevented from moving downwardly beyond the position shown when the back section 5 is lowered and rests upon the upper ends of these supporting arms. Bolts 17 similar to the bolts 8 are slidably mounted in pockets 18 cut in the back section 5, these bolts being provided with actuating stems 19 which extend through slots 20 so that the bolts 17 may be swung outwardly and into the sockets 13 to lock the back section 5 in the lowered position. In addition to locking the back section in the lowered position, these fasteners serve as means for aiding the arms 15 in supporting the back section when lowered.

Figure 2:
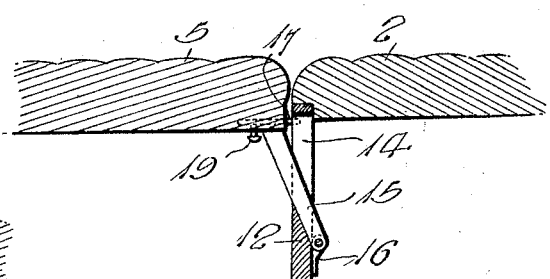
Fig. 2 is a perspective view showing the back swung down to rest upon the support and the auxiliary back rest in place.

When the automobile is in use, the back section 5 will normally be in the raised position of Fig. 1 and the supporting arms 15 will be swung inwardly so that they will not extend through the slots 14. The arms 15 will therefore be out of the way and persons occupying the rear seat will not be liable to trip over them when getting into or out of the car. If it is desired to sleep in the car, the bolts 8 will be swung inwardly to release the back section 5 and this back section will be swung down to the position of Fig. 2 so that it will rest upon the arms 15 which have been swung outwardly to engage and support the back section. The bolts 17 will then be slid outwardly to extend into the sockets 13 and the back will be securely locked in the lowered position. If an occupant of the car should be taken sick while driving and it is desired to have the sick person lie down, the back section 5 can be lowered and locked in the lowered position and since the back section will be locked in this lowered position, the back section will not have a tendency to move vertically as the car passes over rough sections of a road. Therefore, the sick person resting upon the back section and rear seat will not be unduly jolted. It is desired to provide a temporary back rest for the driver of the car when the back section 5 has been lowered, and therefore there has been provided a temporary back rest in the form of a U-shaped frame 21 having its arms carrying cross strips 22 which will be formed of canvas or any other suitable fabric which will provide a soft support for the back of the driver. The arms of this temporary support fit into sockets 23 formed in the wall 24 of the front seat. It will thus be seen that the temporary back support can be readily put in place or removed and further will be firmly held in place when in use. When not in use, this temporary back support will be placed beneath the cushion of the forward seat where it will be out of the way. It will thus be seen that there has been provided an improved construction in an automobile body which will permit of the automobile body being converted into a bed when travelling or camping, and further that the automobile body may be readily converted into a temporary ambulance and that when in use as an ordinary touring car, the body will have a conventional appearance.

I claim:

1. A vehicle body comprising a front seat and a rear seat, said front seat having a back section movable from a vertical to a horizontal position, means for supporting the back section in a horizontal position, and an auxiliary back for the front seat removably mounted in place when the movable back section is lowered.

2. A vehicle body including a front seat and a rear seat, said front seat having a back section movable from a vertical position to a horizontal position, a supporting wall for the front seat having sockets beneath the movable wall section, and a temporary back support having a U-shaped frame and cross strips carried thereby, the arms of the frame fitting into said sockets.

In testimony whereof I have hereunto set my hand.

FRANK MITCHELL.